United States Patent
Yu et al.

(10) Patent No.: US 11,198,066 B2
(45) Date of Patent: Dec. 14, 2021

(54) CONTROL METHOD AND APPARATUS FOR GAME CHARACTER, ELECTRONIC DEVICE AND READABLE MEDIUM

(71) Applicant: NETEASE (HANGZHOU) NETWORK CO., LTD., Hangzhou (CN)

(72) Inventors: Qiao Yu, Hangzhou (CN); Di Zhao, Hangzhou (CN); Jianfeng Shen, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 0 days.

(21) Appl. No.: 16/652,772

(22) PCT Filed: Feb. 28, 2019

(86) PCT No.: PCT/CN2019/076521
§ 371 (c)(1),
(2) Date: Apr. 1, 2020

(87) PCT Pub. No.: WO2019/196568
PCT Pub. Date: Oct. 17, 2019

(65) Prior Publication Data
US 2021/0016176 A1 Jan. 21, 2021

(30) Foreign Application Priority Data
Apr. 10, 2018 (CN) .......................... 201810317878.6

(51) Int. Cl.
*A63F 13/56* (2014.01)
*A63F 13/537* (2014.01)

(52) U.S. Cl.
CPC ............ *A63F 13/56* (2014.09); *A63F 13/537* (2014.09)

(58) Field of Classification Search
CPC ........ A63F 13/005; A63F 13/10; A63F 13/40; A63F 13/42; A63F 13/422; A63F 13/426;
(Continued)

(56) References Cited

U.S. PATENT DOCUMENTS

| 2013/0178281 | A1* | 7/2013 | Ayyar | A63F 13/35 463/30 |
| 2017/0354887 | A1* | 12/2017 | Bollermann | A63F 13/57 |

FOREIGN PATENT DOCUMENTS

| CN | 103723278 A | 4/2014 |
| CN | 105460223 A | 4/2016 |

(Continued)

OTHER PUBLICATIONS https://www.bilibili.com/video/av20967067?from=search&seid=4250247599934052829.
(Continued)

*Primary Examiner* — Omkar A Deodhar
(74) *Attorney, Agent, or Firm* — Qinghong Xu

(57) ABSTRACT

A method for controlling a game character is used for controlling a simulated skydiving action of the game character in a game scene and includes: determining a target position to be landed on; obtaining a real-time location of the game character; determining a real-time flight strategy according to the target position and the real-time location during the simulated skydiving action, wherein the real-time flight strategy, comprises one of a released-parachute flight strategy and a folded-parachute flight strategy and according to the real-time flight strategy, automatically controlling the simulated skydiving action of the game character.

17 Claims, 6 Drawing Sheets

(58) Field of Classification Search
CPC .......... A63F 13/44; A63F 13/45; A63F 13/50; A63F 13/52; A63F 13/525; A63F 13/5258; A63F 13/537; A63F 13/5372; A63F 13/55; A63F 13/56; A63F 13/57; A63F 13/573; A63F 13/58; A63F 13/80; A63F 2300/1006; A63F 2300/5573; A63F 2300/638; A63F 2300/646; A63F 2300/65; A63F 2300/8094; A63F 2031/005
See application file for complete search history.

(56) References Cited

FOREIGN PATENT DOCUMENTS

| CN | 206672404 U | 11/2017 |
|---|---|---|
| CN | 107472543 A | 12/2017 |
| CN | 107886795 A | 4/2018 |
| CN | 108579087 A | 9/2018 |
| JP | 2000176162 A | 6/2000 |
| JP | 2016077462 A | 5/2016 |
| KR | 101089041 B1 | 12/2011 |

OTHER PUBLICATIONS https://www.bilibili.com/video/av18188385?from=search&seid=16112550544341311010.
The ISR issued May 29, 2019 by the WIPO.
The CN1OA issued Mar. 27, 2019 by the CNIPA.
"[Fortnite BR] Parachute (glider) fastest course [Fortnite]", Apr. 4, 2018.
"[PUBG] Unexpectedly important, basic knowledge of parachute descending", Aug. 6, 2017.
"Flight school", Jan. 25, 2007.
The 1st Office Action dated Jun. 8, 2021 for JP patent application No. 2020-515107.

* cited by examiner

CONTROL METHOD AND APPARATUS FOR GAME CHARACTER, ELECTRONIC DEVICE AND READABLE MEDIUM

CROSS-REFERENCE TO RELATED APPLICATIONS

The present application is the 371 application of PCI Application No. PCT/CN2019/076521, filed Feb. 28, 2019, which claims priority to Chinese Patent Application No. 201801317878.6, entitled "Method and Device for Controlling a Game Character", filed on Apr. 10, 2018, the entirty of both which are incorporated by reference.

TECHNICAL FIELD

Embodiments of the present disclosure relate to the field of virtual game technology, and more particularly, to a method for controlling a game character, a device for controlling a game character, an electronic device, and a readable medium.

BACKGROUND

In games such tactical competitions, sandbox athletics, there is usually a scene of simulated skydiving. At the beginning of the game, players board an aircraft or an airship all together. The aircraft or the airship traverses the game map through a random route. During this process, the player landed by airdiving on the target point on the map which is marked by himself or by the teammates.

It should be noted that the information disclosed in the Background section above is merely for enhancing understanding of the background of the present disclosure, and thus may comprise information that does not constitute prior art known to those of ordinary skill in the art.

SUMMARY

The purpose of the present disclosure is to provide a method for controlling a game character, a device for controlling a game character, an electronic device, and a readable medium to solve the problem in the scenes of the existing games that it is difficult for the game players to get the target position that is marked by himself or by his teammate through manual operation.

According to one aspect of the present disclosure, a method for controlling a game character is provided, the method configured to control stimulated skydiving action of a game character in a game scene, the method comprising: determining a target position to be landed on; acquiring a real-time location of the game character; determining a real-time flight strategy based on the target position and the real-time location during a skydiving landing, wherein the real-time flight strategy comprises a released-parachute flight strategy or a folded-parachute flight strategy; and automatically controlling the character to make a landing flight according to the real-time flight strategy.

The present disclosure further discloses a device configured to control simulated skydiving action of a game character in a game scene, the device comprising: a target position determining module configured to determine a target position to be landed on; a real-time position acquiring module, configured to acquire a real-time location of the game character; a real-time flight strategy determining module, configured to determine a real-time flight strategy during a skydiving landing according to the target position and the real-time location, wherein the real-time flight strategy comprises a released-parachute flight strategy or a folded-parachute flight strategy; and a flight module configured to automatically controlling the game character to make a landing flight according to the real-time flight strategy.

The present disclosure further discloses an electronic device comprising: one or more processors; and one or more machine readable medium having instructions stored thereon, when the instructions executed by the one or more processors, the electronic device performs the following steps: determining a target position to be landed on; acquiring a real-time location of the game character; determining a real-time flight strategy during a skydiving landing according to the target position and the real-time location, the flight strategy comprises a released-parachute flight strategy or a folded-parachute flight strategy; and automatically controlling the game character to make a landing flight according to the real-time flight strategy.

The present disclosure further discloses one or more machine-readable medium having instructions stored thereon, when the instructions executed by one or more processors, cause the processor to perform the steps of: determining a target position to be landed on; acquiring a real-time location of the game character determining a real-time flight strategy during a skydiving landing according to the target position and the real-time location, wherein the real-time flight strategy comprises a released-parachute flight strategy or a folded-parachute flight strategy; and automatically controlling the game character to make a landing flight according to the real-time flight strategy.

The above general description and the following detailed description are intended to be illustrative and not restrictive.

BRIEF DESCRIPTION OF THE DRAWINGS

The accompanying drawings, which are incorporated in and constitute a part of the specification, illustrates embodiments in consistent with the present disclosure, and are intended to explain the principles of the present disclosure along with the specification. Obviously, the drawings in the following description are merely some of the embodiments of the present application, and other drawings can be obtained by those skilled in the art according to the drawings without any creative work, wherein.

DETAILED DESCRIPTION

In order to easily understand the above-described objects, features and advantages of the present disclosure, the present disclosure will be described in detail in conjunction with the drawings and the specific embodiments.

When simulating skydiving in a game scene, there are generally two ways:

The first way is that the player manually operates the parachute. For example, the player controls the direction through the left joystick, controls the release of the parachute through a button, and controls the orientation of the parachute by swiping the screen.

The second way is to skydive through manual operation and follow the teammates, for example, choose a teammate to follow, and flight or skydive through following his position.

However, the inventors realized that the above-mentioned skydiving method is difficult for novice players to operate in many detailed operations details such as searching for a target point, the timing for releasing the parachute, selecting a flight angle, and etc., it may be more difficult for the novice players to reach the target position that is marked by his own or by his teammate.

Figure 1:
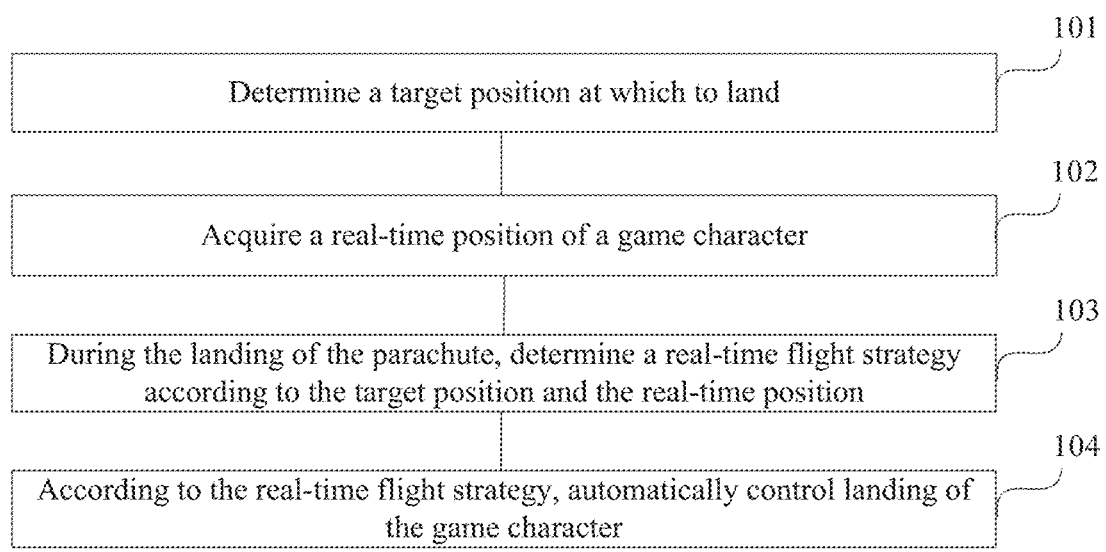
FIG. 1 is a flow chart illustrating the steps of an embodiment of a method for controlling a game character according to an embodiment of the present disclosure.

Referring to FIG. 1, a flowchart of a step of a method for controlling a game character in an embodiment of the present disclosure is illustrated. The embodiment of the present disclosure can be used to control a simulated skydiving action of a game character in a game scenario, and specifically comprises the following steps:

Step 101, determining a target position to be landed on;

Step 102: acquiring a real-time location of the game character.

Step 103: determining a real-time flight strategy during a skydiving landing according to the target position and the real-time location;

Wherein, the real-time flight strategy comprises a released-parachute flight or a folded-parachute flight.

Step 104: automatically controlling game character to make a landing flight according to the real-time flight strategy.

In the embodiment of the present disclosure, for a game scene with simulated skydiving, in the automatic skydiving mode, after determining the target position that the game character needs to land on, a real-time flight strategy during the skydiving landing can be automatically determined through acquiring the real-time position of the game character, wherein the real-time flight strategy can comprise a released-parachute flight or a folded-parachute flight, and while in practice, the released-parachute flight and the folded-parachute flight have different horizontal translation speeds and landing speeds, and the released-parachute flight can go further, and the folded-parachute flight lands faster. Based on this, in the process of skydiving landing, the target position is the landing target point, through the real-time flight strategy, the game character is automatically controlled to fly at a released or folded parachute state, and according to the real-time position, flying at a released-parachute state or flying with a folded parachute state can be switched freely, so that the game character can be easily and accurately landed on the target point, and the accuracy of skydiving landing in the scene is improved. And the entire process of skydiving landing does not require manual operation by the user, and the degree of automation is high, thereby improving the convenience of the game.

Figure 2:
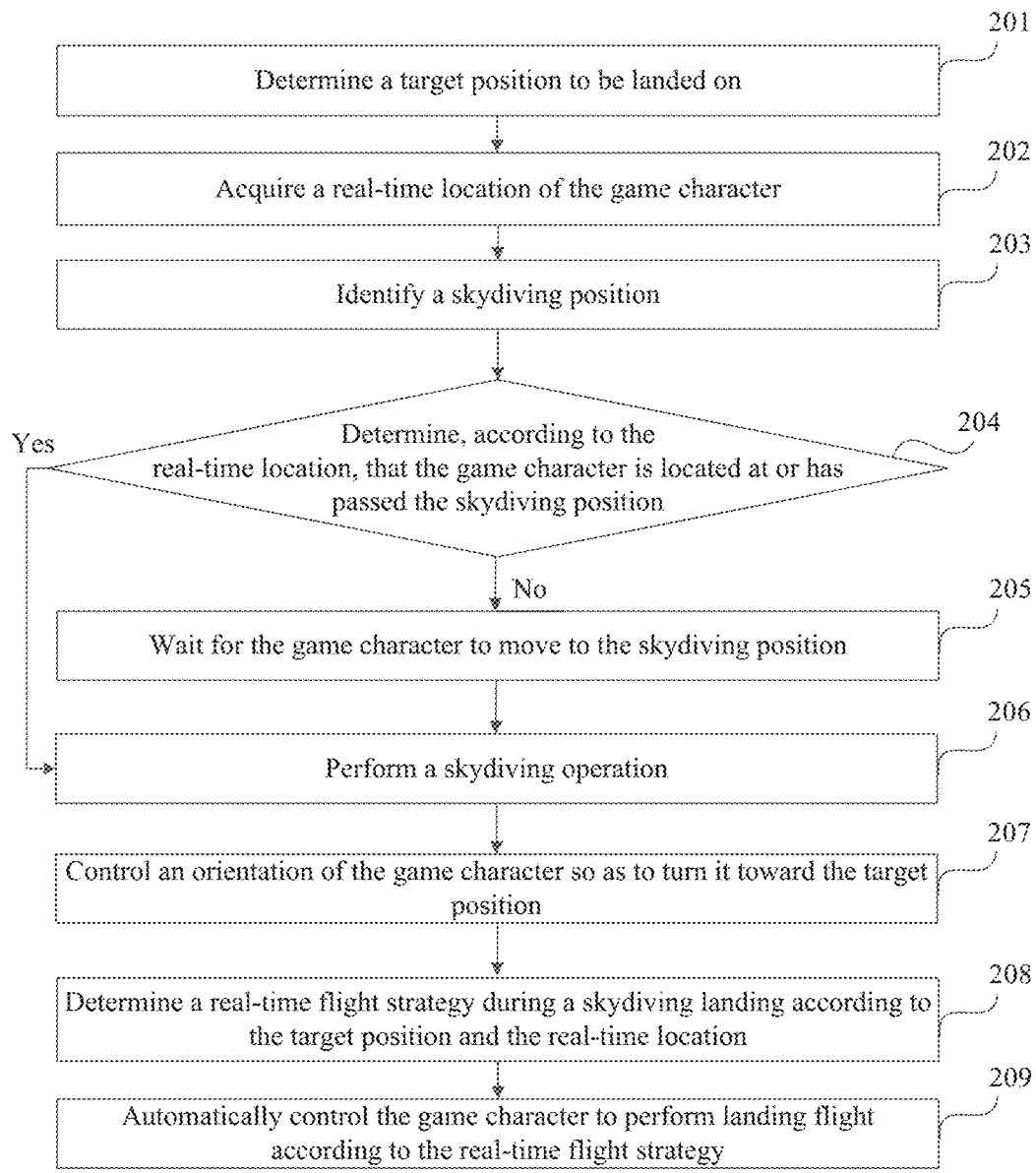
FIG. 2 is a flow chart illustrating the steps of another embodiment of a method for controlling a game character according to an embodiment of the present disclosure.

Referring to FIG. 2, a flow chart of steps of another embodiment of a method for controlling a game character according to an embodiment of the present disclosure is illustrated. The embodiment of the present disclosure can be used to control a simulated skydiving action of a game character in a game scene when the user (the game player, i.e., the player user) enters the automatic skydiving mode, the automatic skydiving scheme of the embodiment of the present disclosure is executed, and when the user triggers to quit the automatic skydiving mode, the user's charge over the skydiving is restored, and the viewing angle is restored to the orientation of the player character's head. In the orientation, the user can control skydiving manually.

In one embodiment, in the game interface of the simulated skydiving displayed to the user, there can be trigger buttons for different functions, and when the user triggers a specific trigger button, the automatic skydiving mode is entered or quitted.

Figure 3:
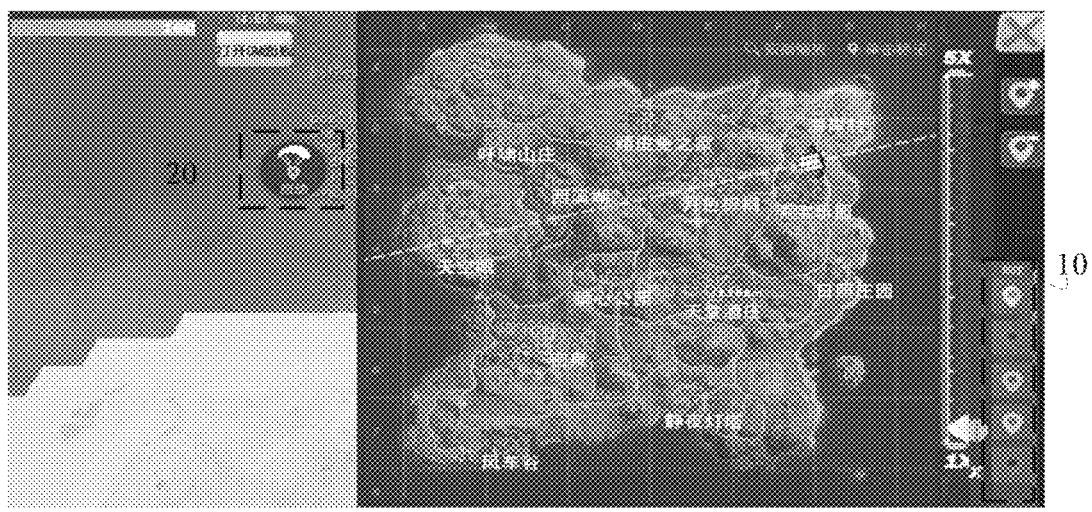
FIG. 3 is a schematic diagram of a game interface in another embodiment of a method for controlling a game character according to an embodiment of the present disclosure.

For example, as illustrated in a schematic diagram of a game interface illustrated in FIG. 3, buttons of the marker points in the region 10 can comprise the player user's own marker point or other teammate's marker point, when the player user clicks the button of any of the marker points in the region 10, or alternatively, when the player user clicks the automatic skydiving button in the region 20, it is determined, that the player user's enter triggering operation, and then the automatic skydiving mode is entered. When the player user wants to quit the automatic skydiving mode, the player user can click the button in the region 20 or click the skydiving quit button (not shown) in the interface, so as to quit the automatic skydiving mode.

In practice, in a scenario of simulated skydiving game, the player user can enter the automatic skydiving mode at any time. For example, the player user can enter the automatic skydiving mode when still in the cabin, or enter the automatic skydiving mode during the skydiving landing.

Further, in order to reminder the player user that he is currently in the automatic skydiving mode, a specific promption can be provided on the game interface. For example, as illustrated in FIG. 3, the automatic skydiving button in the retention 20 is provided a rotating streamer. Another example, in the game text promption are given anywhere in the interface. For example, if the game character is still on the aircraft or the airship, the texts "Automatic skydiving is about to begin" are displayed. If the game character has already skydived, the texts "flight in automatic skydiving" is displayed.

It should be noted that in the automatic skydiving mode, in order to avoid wrong operation by the user, the skydiving button (ie, the button for releasing or folding the parachute) can be hidden. At this time, the viewing angle of the player user can be moved freely, but the direction and speed of the skydiving are no longer affected.

The automatic skydiving process of the embodiment of the present disclosure will be specifically described below The embodiment of the present disclosure can comprise the following steps:

Step 201, determining a target position to be landed on;

In a specific implementation, in a game scene of simulated skydiving, the target position can be a virtual location in the game scene, which is a location corresponding to the target point that the game character needs to land on.

In a preferred embodiment of the embodiments of the present disclosure, step 201 can further comprise the following sub-steps:

Sub-step S11, displaying a virtual map in the game scene, wherein the virtual map comprises one or more markers In practice, the virtual map can be a two-dimensional planar thumbnail of the game scene, for example, as illustrated in FIG. 3, the virtual map can comprise multiple virtual positions.

In a specific implementation, the player user can perform specific operations on the virtual map, such as zoom operations, operations to markers, and the like. When the player user marks a location in a virtual map, the marked location can be used as a marker.

In practice, in order to distinguish the markers of different player users, the markers of different player users can be indicated in different colors.

In region 10 of FIG. 3, a list of markers is displayed that contains all of the markers marked on the virtual map.

In the game interface displaying the virtual map, an automatic skydiving button can further be comprised, as illustrated in the region 20 of FIG. 3. As described above, by clicking the automatic skydiving button in the region 20, the automatic skydiving mode can be entered or quited.

Sub-step S12, setting a position that the marker selected by the user corresponding to the current game character is positioned as the target position.

For example, when a player user clicks on a certain marker in the virtual map (comprising the player user's own marker or other teammate's marker), the marker clicked by the user can be set as a target point, and a position that the clicked marker is located is set as a target location.

For another example, when the player clicks on a certain marker on the list of markers displayed in the region 10 of FIG. 3 (comprising the player's own marker or other teammate's marker), the position of the clicked marker in the virtual map is determined and the position is set as the target position, and at the same time, the automatic skydiving mode is entered.

For another example, When the player user clicks the automatic skydiving button displayed in the region 20 of FIG. 3, it is identified that a marker selected by the play user is a marker of his own, and a position of his own marker in the virtual map is further identified and the position is set as the target position, and at the same time, the automatic skydiving mode is entered.

It should be noted that the manner of identifying the target position to be landed on is merely an example of the embodiment of the present disclosure. One of ordinary skill in the art can identify the target position through other manners, embodiments of the present disclosure are not limited thereto.

Step 202: Acquiring a real-time location of the game character;

In a virtual game, acquiring the real-time location of the game character can be performed once for one frame. In the implementation, the real-time location of the game character in each frame can be obtained through the positioning function in the game scene.

It should be noted that, in the game scene, if the game character has not made a skydiving yet, that is, he is still in the cabin, the real-time location is the real-time location of the aircraft or airship in which the game character is. If the game character has made a skydiving, the real-time location is the real-time location of the game character itself.

Step 203, identifying a skydiving position;

After identifying the target position and the real-time location of the game character in the game scene, the skydiving position can be further determined according to the target position and the real-time location, that is, the timing for the game character to jump out of the aircraft or the airship is determined.

In a preferred embodiment of the embodiments of the present disclosure, step 203 can further comprise the following sub-steps:

drawing a vertical line perpendicular to the route of the game character from the target position, and a position at which the vertical line and the route transects with each other is set as the skydiving position.

Wherein, the route can be the flight route of the aircraft or airship in which the game character is located during the flight.

In a specific implementation, the skydiving position can be a position with shortest distance from the target position.

Among all the segments formed from a point to any point on a straight line, the vertical segment has the shortest length, thus, after determining the target position, a vertical segment can be made from the target position, perpendicular to the route of the aircraft or airship on which the game character is located. Then, the intersection of the vertical line with the route can be set as the position with shortest distance from the target position, and the position with shortest distance from the target position is the skydiving position.

Of course, the skydiving position can be determined in other ways, embodiments of the present disclosure are not limited thereto.

Step 204: Determining, according to the real-time location, that the game character is located at or has passed the skydiving position; if yes, execute step 206; if not, execute step 205.

Step 205, waiting for the game character to move to the skydiving position, and returning to step 204; and Step 206, performing a skydiving operation;

Specifically, after identifying the skydiving position, determining whether the game character reaches the skydiving position or passes the skydiving position according to the real-time position of the acquired game character, and if the game character reaches the skydiving position or has passed the skydiving position, it indicates that the game character reaches the position with shortest distance from the target position, and a skydiving can be made at this time, and the game character is controlled to jump out of the cabin.

If the game character does not reach the skydiving position, the aircraft or airship on which the game character is located is controlled to continue to fly along the route until the game character reaches the skydiving position, and then returning to step 204. if the skydiving position is reached, the result of step 204 is yes, step 206 is performed to perform the skydiving operation, that is, if the game character does not reach the skydiving position, the aircraft or the airship on which the game character is located is waited to fly to the skydiving position so as to perform the skydiving operation.

It should be noted that embodiments of the present disclosure are not limited to the above, and the skydiving operation is performed by determining whether the skydiving position is reached, and reaching the skydiving position is taken as a timing for the skydiving. One of ordinary skill in the art can determine whether it is a timing for the skydiving through other manners, so as to perform the skydiving operation. For example, according to the real-time location, it is determined whether the connection between the real-time location and the target position is perpendicular to the route. If yes, it is determined that it is a timing for the skydiving, and the real-time location is the position with shortest distance from the target position. For another example, the angle between a vector from the real-time location to the route terminal and a vector from the real-time location to the target position is obtained. If the angle is 90°, it is determined that it is a timing for the skydiving, and the real-time location is the position with shortest distance from the target position.

Step 207, controlling an orientation of the game character so as to turn it toward the target position.

Specifically, after performing the skydiving operation, in order to approach the target position as much as possible during the flight before starting the landing, in the embodiment of the present disclosure, the orientation of the game character can be controlled so as to turn the orientation of the game character to the target position.

In a specific implementation, an angular velocity can be preset according to an empirical value, and during turning the game character, the orientation of the game character can be turned toward the target position according to the angular velocity.

Step 208: determining a real-time flight strategy during a skydiving landing according to the target position and the real-time location.

in the embodiment of the present disclosure, in the skydiving landing process of the game character, if the automatic skydiving mode is on, the real-time flight strategy in each frame can be determined according to the target position and the real-time position of the game character in each frame.

As an example, the real-time flight strategy can comprise at least a released-parachute flight strategy, a folded-parachute flight strategy, a downward flight strategy with a folded-parachute at a set maximum tilt angle, and the like.

In the specific implementation, a released-parachute flight and a folded-parachute flight of the game character have different translation speeds and descending speeds, and the minimum descending speed and the maximum translation speed of the both are also different. In the released-parachute flight, the maximum translation speed and the minimum descending speed will be reduced, and the minimum descending speed will be reduced more. Therefore, the flight distance of the released-parachute flight can be farther, While the maximum flight speed and minimum descending speed of the folded-parachute flight is faster than the released-parachute flight, so it takes less time to land. Therefore, in embodiments of the present disclosure, in order to more accurately approach the target position, a real-time flight strategy should be determined.

In a preferred embodiment of the embodiments of the present disclosure, step 208 can further comprise the following sub-steps:

Sub-step S21, determining a reference position range;

In the specific implementation, it is difficult to accurately land on the target position during the skydiving process, and it is also possible to land near the target position, and the region near the target position can be referred to as the reference position range.

As an example, the reference position range can be a region range determined according to a preset radius and centered on the target position.

Sub-step S22, calculating a real-time distance difference between the real-time location and the target position;

As an example, the real-time distance difference can comprise, but is not limited to, a real-time horizontal distance difference, a real-time height difference, real-time direction difference, etc.

In one embodiment, the real-time distance difference can be calculated as follows:

Suppose coordinates of the target position is v0=(x0, y0, z0), and coordinates of the real-time location is v1=(x1, y1).

Based on the coordinates of the target position and the coordinates of the real-time location, a target direction, target_dir=(x0, 0, z0)–(x1, 0, z1), can be obtained, and the game character also has a moving direction at the real-time position, which is recorded as (dx, dy, dz), let cur_dir=(dx, 0, dz), the two vectors, cur_dir and target_dir, are vectors within the x-z plane, then the real-time direction difference is the angle between the two vectors cur_dir and target_dir angle.

The real-time height difference is (y1-y0), Which is the difference in altitude between the real-time location and the target position.

The real-time horizontal distance difference is the distance between the two coordinate points of (x0, 0, z0) and (x1, 0, z1), that is, projection of the distance between the real-time location and the target position in the x-z plane.

Sub-step S23, determining whether the game character is able to reach the overhead area of the reference position range in a folded-parachute state according to the real-time distance difference; if yes, executing sub-step S24, if not, executing sub-step S25;

Sub-step S24, determining that the real-time flight strategy is folded-parachute flight strategy;

Sub-step S25, determining that the real-time flight strategy is a releasted-parachute flight strategy;

Specifically, after obtaining the real-time distance difference between the real-time location and the target position, it can be determined according to the real-time distance difference whether the game character is able to reach the overhead area of the reference position range in a folded-parachute state. If the game character is able to reach the overhead area of the reference position range in a folded-parachute state, it is determined that the real-time flight strategy is a folded parachute flight strategy. Otherwise, if the game character is not able to reach the overhead area of the reference position range in the folded-parachute state, it is determined that the real-time flight strategy is a released parachute flight strategy.

As an example, the overhead area can be an area with a preset radius from the reference position range and over the reference position range, that is, the distance between the reference position range and the overhead area is equal to the preset radius.

In a preferred embodiment of the embodiment of the present disclosure, the sub-step S23 can further comprise the following sub-steps:

Calculating the flight duration required to descend by a vertical distance to the reference position range according to the minimum descending speed set for the folded-parachute flight; calculating the flight distance in the flight duration according to the maximum horizontal translation speed set during the folded-parachute flight. If the flight distance is less than the real-time horizontal distance difference, it is determined that it is not able to reach the overhead area of the reference position range in the folded-parachute state; if the flight distance is greater than or equal to the real-time horizontal distance difference, then it is determined that it is able to reach the overhead area of the reference position range in the folded-parachute state.

For example, supposing that the minimum descending speed during the folded-parachute flight is set as 10 m/s, the maximum horizontal translation speed is set as 20 m/s, the vertical distance to the reference position range is 100 m, and the real-time horizontal distance difference is 260 m, then, flight duration required to descend to the target position at the minimum descending speed will be 10 s, and in the flight duration, the flight distance in the horizontal direction at the maximum horizontal translation speed will be 200 m, which is less than the real-time horizontal distance difference. But, if the real-time horizontal distance difference is 160 m, the flight distance of 200 m is greater than the real-time horizontal distance difference, and it can be determined that the game character is able to reach the overhead area of the reference position range in the folded-parachute state.

Sub-step S26, when the game character reaches the overhead area, determining a downward flight strategy with a folded-parachute at a preset tilt angle as the real-time flight strategy.

If the real-time location of the game character indicates that the game character has reached the overhead area of the reference position range, a downward flight strategy with a folded-parachute at a preset tilt angle can be set as the real-time flight strategy, for example, a downward flight strategy with a folded-parachute at a preset maximum tilt angle, such as 85°.

It should be noted that in the downward flight strategy with a folded-parachute at a preset tilt angle, the direction of the game character cannot be turned any longer so as to avoid frequent changes in direction in a small range. Unless the game character flies out of the preset radius range during this process, the direction of the game character is turned to a direction toward the target position again.

Step 209: Automatically controlling the game character to perform landing flight according to the real-time flight strategy.

In a specific implementation, after the real-time flight strategy for each frame is determined, the game character can be controlled to automatically perform the real-time flight strategy in real time, For example, if the game character does not reach the above-mentioned overhead area, and if the real-time flight strategy is a folded-parachute flight strategy, the game character is automatically controlled to perform a folded-parachute flight strategy. And if the real-time flight strategy is a released-parachute flight strategy, the game character is controlled to perform the released-parachute flight strategy. During the entire landing process, a real-time flight strategy will be determined each time a real-time position is calculated. In this process, the released-parachute flight strategy and the folded-parachute flight strategy can be switched from one to the other, based on actual determining results, so as to make the game character to land on the target position as accurately as possible.

In practice, when reaching the overhead area, before performing the downward flight strategy with a folded-parachute at a preset tilt angle, the orientation of the game character can be turned to the direction toward the target position at the set angular velocity, and then the game character is controlled to fly downward at a preset tilt angle.

In a preferred embodiment of the embodiments of the present disclosure, the embodiment of the present disclosure can further comprise the following steps:

acquiring a landing position; if the landing position is not within the reference position range, controlling the game character to navigate to the reference position range.

In the specific implementation, during the skydiving landing, if the landing position in a case of released-parachute flight during the entire landing process is not within the reference position range, then the game character can be controlled to navigate to the target position after the game character landing.

According to an embodiment of the present disclosure, when the user determines the target position again, steps 201 to 209 of the embodiment of the present disclosure can be performed again to meet game requirements by different target position.

It should be noted that the methods according to the embodiments of the present disclosure can be executed on the client, on the server, or through interaction between the client and the server (the client is responsible for displaying and detecting the functions operated by the user, and the server is responsible for calculating logically). The embodiments of the present disclosure are not limited hereto.

In embodiments of the present disclosure, no matter what stage of the scene of the simulated skydiving is, the automatic skydiving mode can be entered. In the automatic skydiving mode, after determining the target position of the game character to be landed and identifying the real-time location of the game character, the skydiving can be determined. A timing for skydiving and a real-time flight strategy for the landing process can be determined, through the released-parachute flight and/or folded-parachute flight prompted by the real-time flight strategy, the game character can he landed on the target position as accurately as possible, thereby improving the accuracy of skydiving landing.

In addition, the automatic skydiving mode according to the embodiment of the present disclosure does not require manual operation by the user, and can be performed automatically, such that it is easy for the user to get started. Even the player who plays simulated parachute games such as the tactical competition and the sandboxing game for the first time can land on a predetermined target position on the map.

It should be noted that, as to the method embodiments, for the sake of simple description, they are all expressed as a series of action combinations, but one of ordinary skill in the art should understand that the embodiments of the present disclosure are not limited to the described action sequence, and in accordance with embodiments of the present disclosure, some steps can be performed in other sequences or concurrently. And further, it should be also understood by one of ordinary skill in the art that the embodiments described in the specification are all preferred embodiments, and the actions involved are not essentially required by embodiments of the present disclosure.

Figure 4:
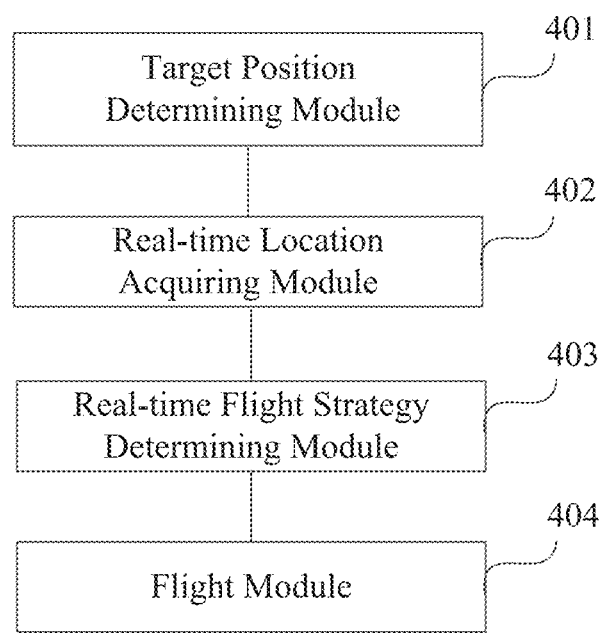
FIG. 4 is a block diagram of an embodiment of a device for controlling a game character according to an embodiment of the present disclosure.

FIG. 4 is a structural block diagram of a control device for a game character according to an embodiment of the present disclosure. The embodiment of the present disclosure can be used to control simulated skydiving action of a game character in a game scenario, and can specifically comprise the following modules:

a target position determining module 401, configured to determine a target location to be landed on;

a real-time location acquiring module 402, configured to acquire a real-time location of the game character;

a real-time flight strategy determining module 403, configured to determine a real-time flight strategy according to the target position and the real-time location during a skydiving landing, wherein the real-time flight strategy comprises a released-parachute flight strategy or a folded-parachute flight strategy;

a flight module 404, configured to automatically control the game character to perform a landing flight according to the real-time flight strategy.

In a preferred embodiment of the embodiments of the present disclosure, the device can further comprise the following modules:

a skydiving position identifying module configured to identify a skydiving position;

a judging module, configured to determine, according to the real-time location, whether the game character is located at or has passed the skydiving position; if yes, performing a skydiving operation; if not, waiting for the game character to move to the skydiving position and performing a skydiving operation.

In a preferred embodiment of the embodiment of the present disclosure, the skydiving position identifying module is further configured to:

draw a vertical line perpendicular to the route of the game character from the target position, and a position where the vertical line and the route transects with each other is identified as a skydiving position.

In a preferred embodiment of the embodiments of the present disclosure, the device can further comprise the following modules:

a turning module configured to control an orientation of the game character to turn toward the target position.

In a preferred embodiment of the present disclosure, the target position determining module 401 can comprise the following submodules:

a map display sub-module for displaying a virtual map in a game scene, wherein the virtual map comprises one or more markers; and a target position selection sub-module configured to set a position of the a marker selected by the user corresponding to the current game character as the target position.

In a preferred embodiment of the present disclosure, the real-time flight policy determining module 403 can comprise the following sub-modules:

a reference position range determining sub-module, configured to determine a reference position range, wherein the reference position range is an area range determined according to a preset radius and centered on the target position;

a real-time distance difference calculating sub-module, configured to calculate a real-time distance difference between the real-time location and the target position;

A folding-parachute determining sub-module, configured to determine, according to the real-time distance difference, whether the game character is able to reach an overhead area of the reference position range in a folded-parachute state, and if yes, recall a first strategy determining sub-module, if not, recall the second strategy determination submodule;

a first strategy determining sub-module, configured to determine a folded-parachute flight strategy as the real-time flight strategy;

a second strategy determining sub-module, configured to determine a released-parachute flight strategy as the real-time flight strategy;

The third strategy determining sub-module, configured to determine, when the game character reaches the upper air region, a downward flight strategy with a folded-parachute at a preset tilt angle as the real-time flight strategy.

In a preferred embodiment of the present disclosure, the real-time distance difference comprises a real-time horizontal distance difference and a real-time height difference;

The folding-parachute determining sub-module is further configured to:

Calculate the flight duration required to descend by a vertical distance corresponding to the reference position range according to the minimum descending speed set for folded-parachute flight, Calculate a flight distance in the flight duration according to the maximum horizontal translation set for folded-parachute flight;

If the flight distance is less than the real-time horizontal distance difference, it is determined that it is not able to reach the overhead area of the reference position range in the folded-parachute state;

If the flight distance is greater than or equal to the real-time horizontal distance difference, it is determined that it is able to reach the overhead area of the reference position range in the folded-parachute state.

In a preferred embodiment of the embodiments of the present disclosure, the device can further comprise the following modules:

a landing position acquiring module configured to acquire a landing position; and a navigation module, configured to control the game character to navigate to the reference position range if the landing position is not within the reference position range.

For the device embodiment, since it is substantially similar to the above method embodiment, the description is relatively simple, and relevant parts can be referred to the description of the method embodiment.

Figure 5:
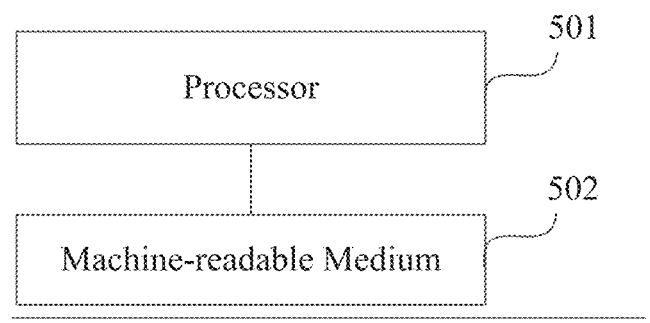
FIG. 5 is a structural block diagram of an electronic device according to an embodiment of the present disclosure.

Embodiments of the disclosure further discloses an electronic device. FIG. 5 is a structural block diagram of an electronic device according to an embodiment of the present disclosure. As shown in FIG. 5, the electronic device includes;

One or more processors 501; and

One or more machine-readable medium 502 having instructions stored thereon that, when executed by the one or more processors, cause the electronic device to perform a method for controlling a game character as described above.

Figure 6:
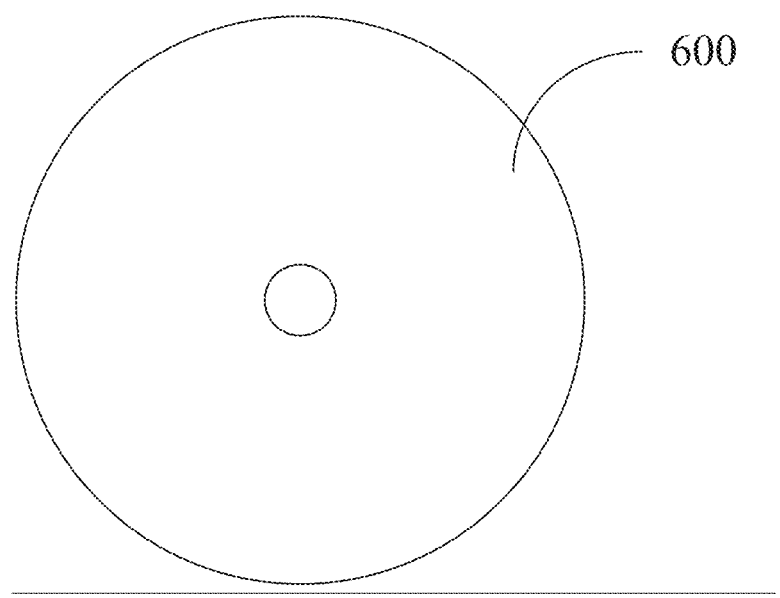
FIG. 6 is a schematic diagram of a machine-readable medium according to an embodiment of the present disclosure.

FIG. 6 is a schematic diagram of a machine-readable medium according to an embodiment of the present disclosure. As shown in FIG. 6, embodiments of the present disclosure further disclose one or more machine-readable medium 600 having instructions stored thereon that, when executed by one or more processors, cause the processor to perform a method for controlling a game character as described above.

The various embodiments in the present specification are described in a progressive manner, and description of each embodiment focuses on differences from other embodiments, and the same or the similar parts between the various embodiments can be referred to each other.

One ordinary skill in the art will appreciate that embodiments of the disclosed embodiments can be provided as a method, device, or computer program product. Thus, embodiments of the present disclosure can take the form of an entirely hardware embodiment, an entirely software embodiment, or a combination of software and hardware. Moreover, embodiments of the present disclosure can take the form of a computer program product embodied on one or more computer usable storage medium (comprising and not limited to disk storage, CD-ROM, optical storage, etc.) comprising computer usable program code.

Embodiments of the present disclosure are described with reference to flowchart and/or block diagrams of methods, terminal devices (systems), and computer program products according to embodiments of the present disclosure. It should be understood that each process and/or block of the flowchart or the block diagrams, and a combination of process and/or block of the flowchart or the block diagrams by computer program instructions can be implemented. The computer computer instructions can be provided to a general purpose computer, special purpose computer, embedded processor or other programmable data processing terminal device to produce a machine such that instructions executed by a processor of a computer or other programmable data processing terminal device are configured to produce a device for implementing the functions specified in one or more of the processes in the flowchart or in one or more blocks of the diagram blocks.

The computer program instructions can further be stored in a computer readable memory that can direct a computer or other programmable data processing terminal device to operate in a particular manner, such that the instructions stored in the computer readable memory produce a product comprising the instruction device. The instruction device implements the functions specified in one or more of the processes in the flowchart or in one or more blocks of the diagram blocks.

These computer program instructions can further be loaded onto a computer or other programmable data processing terminal device such that a series of operational steps are performed on the computer or other programmable terminal device to produce computer-implemented processing, such that the instructions executed on the computer or other programmable terminal device provide steps for implementing the functions specified in one or more of the processes in the flowchart or in one or more blocks of the diagram blocks.

While the preferred embodiment of the present invention has been described, it will be apparent that one of ordinary skill in the art can make further changes and modifications to the embodiments upon learning the essential inventive concept of the present disclosure. Therefore, the appended claims are intended to be interpreted as comprising the preferred embodiments and the modifications and variations falling into the scope of the embodiments.

Finally, it should also be noted that in this context, relational terms such as first and second are used merely to distinguish one entity or operation from another entity or operation, and do not necessarily require or imply that there is relation or sequence between these entities or operations. Furthermore, the terms "comprises" or "including" or "containing" or any other variations that are intended to encompass a non-exclusive inclusion, such that a process, method, article, or terminal device that comprises a plurality of elements comprises not only those elements but also other elements that are named specifically, or comprise elements inherent to such a process, method, article, or terminal device. An element defined by the phrase "comprising a . . . " does not exclude the presence of additional identical elements in the process, method, article, or terminal device that comprises the element, without further limitation.

The method for controlling a game character and the control device for controlling a game character provided by the present disclosure are described in detail above, and the principles and the embodiments of the present disclosure are depicted through specific examples. However, the description of the embodiments is merely provided for understanding the gist of the methods and the devices of the present disclosure. And based on the gist of the present disclosure, modifications in the specific embodiments and in the applications of the present disclosure can easily occur to one of ordinary skill in the art. And in general, the contents contained in die description cannot be construed as a limit to the present disclosure.

What is claimed is:

1. A method for controlling a game character, the method configured to control a simulated skydiving action of the game character in a game scene, the method comprising:
   determining a target position to be landed on;
   obtaining a real-time location of the game character;
   determining a real-time flight strategy according to the target position and the real-time location during the simulated skydiving action, wherein the real-time flight strategy comprises one of a released-parachute flight strategy and a folded-parachute flight strategy; and
   according to the real-time flight strategy, automatically controlling the simulated skydiving action of the game character,
   wherein determining the target position to be landed on comprises:
      displaying a virtual map in the game scene, wherein the virtual map comprises at least one marker; and
      taking a position of a marker selected by a user corresponding to the game character as the target position.

2. The method according to claim 1, wherein before determining the real-time flight strategy according to the target position and the real-time location during the simulated skydiving action, the method further comprises:
   identifying a skydiving position;
   according to the real-time location, determining whether the game character is located at or has passed the skydiving position;
   in response to the game character is located at the skydiving position or has passed the skydiving position, performing a skydiving operation;
   in response to the game character is not located at the skydiving position and has not passed the skydiving position, performing the skydiving operation after waiting for the game character to move to the skydiving position.

3. The method according to claim 2, wherein identifying the skydiving position comprises:
   drawing a vertical line perpendicular to the route of the game character from the target position, and taking a position where the vertical line and the route transect with each other as the skydiving position.

4. The method according to claim 2, wherein after performing the skydiving operation, the method further comprises:
   controlling an orientation of the game character to turn toward the target position.

5. The method according to claim 1, wherein, determining a real-time flight strategy according to the target position and the real-time location during the simulated skydiving action comprises:
   determining a reference position range, wherein the reference position range is a range area determined according to a preset radius and centered on the target position;
   calculating a real-time distance difference between the real-time location and the target position;
   according to the real-time distance difference, determining whether the game character is able to reach an overhead area of the reference position range in a folded-parachute state;
   in response to the game character is able to reach an overhead area of the reference position range in the folded-parachute state, setting a folded-parachute flight strategy as the real-time flight strategy;
   in response to the game character is not able to reach an overhead area of the reference position range in the folded-parachute state, setting a released-parachute flight strategy as the real-time flight strategy;
   in response to the game character reaches the overhead area, setting a downward flight strategy with a folded-parachute at preset tile angle as the real-time flight strategy.

6. The method according to claim 5, wherein the real-time distance difference comprises a real-time horizontal distance difference and a real-time height difference;
   according to the real-time distance difference, determining whether the game character is able to reach the overhead area of the reference position range in the folded-parachute state, comprising:

calculating a flight duration required to descend by a vertical distance to the reference position range according to the minimum descending speed set for the folded-parachute flight;

calculating a flight distance in the flight duration according to the maximum horizontal translation speed set for the folded-parachute state;

in response to the flight distance is less than the real-time horizontal distance difference, determining that it is not able to reach the overhead area of the reference position range in the folded-parachute state;

in response to the flight distance is greater than or equal to the real-time horizontal distance difference, determining that it is able to reach the overhead area of the reference position range in the folded-parachute flight state.

7. The method according to claim 5, wherein after controlling the simulated skydiving action of the game character according to the real-time flight strategy, the method further comprises:

acquiring a landing position; and in response to the landing position is not within the reference position range, controlling the game character to navigate to the reference position range.

8. An electronic device comprising:

one or more processors; and one or more machine readable medium having instructions stored thereon that, when executed by the one or more processors, cause the one or more processors to control a simulated skydiving action of the game character in a game scene, wherein the one or more processors are configured to:

determine a target position to be landed on;

obtain a real-time location of the game character;

determine a real-time flight strategy according to the target position and the real-time location during the simulated skydiving action, wherein the real-time flight strategy comprises one of a released-parachute flight strategy and a folded-parachute flight strategy; and according to the real-time flight strategy, automatically control the simulated skydiving action of the game character, wherein the one or more processors are configured to:
display a virtual map in the game scene, wherein the virtual map comprises at least one marker; and
take a position of a marker selected by a user corresponding to the game character as the target position.

9. A non-transitory machine readable medium having instructions stored thereon that, when executed by one or more processors, cause the one or more processors to control a simulated skydiving action of the game character in a game scene, comprising:

determining a target position to be landed on;

obtaining a real-time location of the game character;

determining a real-time flight strategy according to the target position and the real-time location during the simulated skydiving action, wherein the real-time flight strategy comprises one of a released-parachute flight strategy and a folded-parachute flight strategy; and according to the real-time flight strategy, automatically controlling the simulated skydiving action of the game character, wherein the one or more processors are caused to:
display a virtual map in the game scene, wherein the virtual map comprises at least one marker; and
take a position of a marker selected by a user corresponding to the game character as the target position.

10. The electronic device according to claim 8, wherein the one or more processors are configured to: before determining the real-time flight strategy according to the target position and the real-time location during the simulated skydiving action, identify a skydiving position;

according to the real-time location, determine whether the game character is located at or has passed the skydiving position;

in response to the game character is located at the skydiving position or has passed the skydiving position, perform a skydiving operation;

in response to the game character is not located at the skydiving position and has not passed the skydiving position, perform the skydiving operation after waiting for the game character to move to the skydiving position.

11. The electronic device according to claim 10, wherein the one or more processors are configured to:

draw a vertical line perpendicular to the route of the game character from the target position, and take a position where the vertical line and the route transect with each other as the skydiving position.

12. The electronic device according to claim 10, wherein the one or more processors are configured to:

after performing the skydiving operation, control an orientation of the game character to turn toward the target position.

13. The electronic device according to claim 8, wherein the one or more processors are configured to:

determine a reference position range, wherein the reference position range is a range area determined according to a preset radius and centered on the target position;

calculate a real-time distance difference between the real-time location and the target position;

according to the real-time distance difference, determine whether the game character is able to reach an overhead area of the reference position range in a folded-parachute state;

in response to the game character is able to reach an overhead area of the reference position range in the folded-parachute state, set a folded-parachute flight strategy as the real-time flight strategy;

in response to the game character is not able to reach an overhead area of the reference position range in the folded-parachute state, set a released-parachute flight strategy as the real-time flight strategy;

in response to the game character reaches the overhead area, set a downward flight strategy with a folded-parachute at preset tile angle as the real-time flight strategy.

14. The electronic device according to claim 13, wherein the real-time distance difference comprises a real-time horizontal distance difference and a real-time height difference;

the one or more processors are configured to:

calculate a flight duration required to descend by a vertical distance to the reference position range according to the minimum descending speed set for the folded-parachute flight;

calculate a flight distance in the flight duration according to the maximum horizontal translation speed set for the folded-parachute state;

in response to the flight distance is less than the real-time horizontal distance difference, determine that it is not able to reach the overhead area of the reference position range in the folded-parachute state;

in response to the flight distance is greater than or equal to the real-time horizontal distance difference, determine that it is able to reach the overhead area of the reference position range in the folded-parachute flight state.

15. The electronic device according to claim 13, wherein the one or more processors are configured to: after controlling the simulated skydiving action of the game character according to the real-time flight strategy,
   acquire a landing position; and
   in response to the landing position is not within the reference position range, control the game character to navigate to the reference position range.

16. The non-transitory machine readable medium according to claim 9, wherein before determining the real-time flight strategy according to the target position and the real-time location during the simulated skydiving action, the one or more processors are further caused to:
   identify a skydiving position;
   according to the real-time location, determine whether the game character is located at or has passed the skydiving position;
   in response to the game character is located at the skydiving position or has passed the skydiving position, perform a skydiving operation;
   in response to the game character is not located at the skydiving position and has not passed the skydiving position, perform the skydiving operation after waiting for the game character to move to the skydiving position.

17. The non-transitory machine readable medium according to claim 9, wherein the one or more processors are caused to:
   determine a reference position range, wherein the reference position range is a range area determined according to a preset radius and centered on the target position;
   calculate a real-time distance difference between the real-time location and the target position;
   according to the real-time distance difference, determine whether the game character is able to reach an overhead area of the reference position range in a folded-parachute state;
   in response to the game character is able to reach an overhead area of the reference position range in the folded-parachute state, set a folded-parachute flight strategy as the real-time flight strategy;
   in response to the game character is not able to reach an overhead area of the reference position range in the folded-parachute state, set a released-parachute flight strategy as the real-time flight strategy;
   in response to the game character reaches the overhead area, set a downward flight strategy with a folded-parachute at preset tile angle as the real-time flight strategy.

* * * * *